United States Patent
Pu et al.

(10) Patent No.: US 8,971,068 B2
(45) Date of Patent: Mar. 3, 2015

(54) THREE-PHASE RECTIFICATION MODULE, THE SYSTEM THEREOF AND HARMONIC SUPPRESSION METHOD

(75) Inventors: Boyu Pu, Shanghai (CN); Jinping Zhou, Shanghai (CN); Yi Zhang, Shanghai (CN); Wei Chen, Shanghai (CN)

(73) Assignee: Delta Electronics (Shanghai) Co., Ltd, Shanghai (CN)

( * ) Notice: Subject to any disclaimer, the term of this patent is extended or adjusted under 35 U.S.C. 154(b) by 248 days.

(21) Appl. No.: 13/466,739

(22) Filed: May 8, 2012

(65) Prior Publication Data

US 2013/0083571 A1  Apr. 4, 2013

(30) Foreign Application Priority Data

Sep. 29, 2011 (CN) .......................... 2011 1 0295391

(51) Int. Cl.
- H02M 1/12 (2006.01)
- H02P 27/06 (2006.01)
- H02M 7/219 (2006.01)
- H02M 7/487 (2007.01)

(52) U.S. Cl.
CPC .............. *H02M 1/126* (2013.01); *H02P 27/06* (2013.01); *H02M 2007/2195* (2013.01); *Y02B 70/1408* (2013.01); *H02M 7/487* (2013.01)
USPC .......................................................... 363/44

(58) Field of Classification Search
None
See application file for complete search history.

(56) References Cited

U.S. PATENT DOCUMENTS

| | | | | |
|---|---|---|---|---|
| 5,491,624 A * | 2/1996 | Levran et al. | ................... | 363/87 |
| 7,375,989 B2 * | 5/2008 | Colombi et al. | ................. | 363/44 |
| 7,518,893 B2 * | 4/2009 | Ponnaluri et al. | ............... | 363/62 |
| 7,751,212 B2 * | 7/2010 | Perkinson | ..................... | 363/127 |
| 2005/0013147 A1 * | 1/2005 | Villablanca | ................. | 363/44 |
| 2006/0056207 A1 * | 3/2006 | Sarlioglu | ........................ | 363/44 |
| 2007/0070660 A1 * | 3/2007 | Tallam | ............................ | 363/44 |
| 2009/0040800 A1 * | 2/2009 | Sonnaillon et al. | ............. | 363/89 |
| 2011/0141774 A1 * | 6/2011 | Kane et al. | ...................... | 363/37 |

OTHER PUBLICATIONS

Johann W. Kolar et al., Design and Experimental Investigation of a Three-Phase High Power Density High Efficiency Unity Power Factor PWM (Vienna) Rectifier Employing a Novel Integrated Power Semiconductor Module, 1996 IEEE, p. 514-523.

Johann W. Kolar et al., A Novel Three-Phase Utility Interface Minimizing Line Current Harmonics of High-Power Telecommunications Rectifier Modules, 1994 IEEE, p. 367-374.

* cited by examiner

*Primary Examiner* — Jessica Han
*Assistant Examiner* — Monica Mata
(74) *Attorney, Agent, or Firm* — Tim Tingkang Xia, Esq.; Morris, Manning & Martin, LLP

(57) ABSTRACT

A three-phase rectification module, the system thereof and harmonic suppression method are provided. The module includes an LCL filter unit, a Vienna rectifier coupled to the LCL filter unit, and a rectifier control unit for controlling the power factor of the three-phase AC power source and the DC output voltage of the Vienna rectifier. A commutation diode is serially connected on the bridge-arm of each set of uni-directional rectification branches which are included in the Vienna rectifier, making it function as current uni-directionally. Herein, the power factor of the three-phase AC power source is matched with the parameters of the LCL filter unit, such that the absolute value of the phase difference between the AC input voltage and the current of the Vienna rectifier is close or equal to zero.

23 Claims, 6 Drawing Sheets

THREE-PHASE RECTIFICATION MODULE, THE SYSTEM THEREOF AND HARMONIC SUPPRESSION METHOD

CROSS REFERENCE TO RELATED APPLICATIONS

The present invention claims priority under 35 U.S.C. §119 to Chinese Patent Application No. 201110295391.0, filed on Sep. 29, 2011, the entire content of which is incorporated herein by reference.

FIELD OF THE INVENTION

The invention relates to an active front end used in power electronics technology, and more particularly, to a three-phase rectification module, the system thereof and a method for suppressing harmonic in rectification system with inductor-capacitor-inductor (LCL for short) filter.

BACKGROUND OF THE INVENTION

The development in the switch device of the power semiconductor promotes the devolvement in the technology of the power electronic converter device rapidly, such that various types of converter device emerge with the Pulse-width modulation (PWM for short) Technology. The active front end has been widely used in the field of power electronic technology, having the high power factor and the low Total Harmonic Distortion (THD for short).

Currently, a three-phase PWM rectifier is a common active front end in the market. The three-phase PWM rectifier includes three parallel single-phase bridge-arms, and each set of them has a number of switch elements. When the switch elements in the upper and lower bridge-arms are turned off simultaneously, the phenomena of break-though may occur which results in damage to elements of the rectifier easily. With many elements, complicate structure and high price, the three-phase PWM rectifier is often used in the energy feedback application.

The three-phase PWM rectifier may cause switch order harmonic voltage and current during performing switch action, which pollutes the gird. Thus, elimination of current harmonics in the three-phase PWM rectifier absorbs the concern in the industry.

In order to satisfy the characteristic of the three-phase PWM rectifier requiring a passive device to store energy in operation and reduce harmonic component of the current into the gird in proximity to switch frequency of the three-phase PWM rectifier, the passive device is required to be serially connected between the three-phase PWM rectifier and grid for filtering.

FIG. 1 is a diagram of a circuit in which a three-phase PWM rectification unit with inductor L filtering is connected with grid in the art. The three-phase PWM rectification unit 2 is coupled with grid through three sets of inductor L filter unit 1, and converts AC input voltage with fixed operation frequency on grid to DC output voltage. On the one hand, the inductor L in the inductor L filter unit 1 can function as an element of storing energy which makes the three-phase PWM rectification unit 2 having operation nature of Boost, and on the other hand, the inductor L can function as a filter unit for filtering switch harmonic.

When the inductor L is selected as a filter unit, harmonic is attenuated at a rate of −20 dB/Dec for all range of frequencies, thus the rate is low. However, in the case of high power application, since switch frequency is lower, a higher rate of attenuation of harmonic is required, thus it is required to add inductance to achieve better filtering effect for switch harmonic. As known, increasing inductance can prolong the response time of the entire system so as to reduce dynamic performance of the system, and the volume and the cost of the inductor L may greatly increase along with the increase of power of the active rectification unit, which limits its application in the case of large power.

Therefore, it is an urgent issue how to develop a three-phase rectification module capable of applying in the case of medium and high voltage and large power, small amount of inductance used, fewer switching devices, simple structure, anti-break-though capability, and low price.

SUMMARY OF THE INVENTION

The purpose of the present invention is to employ a three-phase uni-directional rectification unit and a LCL filter unit for filtering harmonic to replace a conventional L filter unit in the case of medium and high voltage and large power, which aims at no risk of bridge-arm breaking through, avoiding high order harmonic resulted by switching of switcher and low order harmonic resulted by out-of-control region in the three-phase rectification module, to meet the requirement of attenuation for higher harmonic in condition of less inductance and to suppress the production of low order harmonic.

In one aspect, to achieve the above purposes, a solution of a three-phase rectification module of the invention is as follows.

The three-phase rectification module connected with the three-phase AC power source, the module includes a Vienna rectifier, three sets of LCL filter unit and a rectifier control unit for controlling the power factor of the three-phase AC power source to be less than one and the DC output voltage of the Vienna rectifier. The Vienna rectifier comprises three sets of the single phase rectification bridge-arms connected in parallel, wherein at least one commutation diode is serially connected on each set of the single phase rectification bridge-arms to make the current of the bridge-arm function as uni-direction. Each set of the LCL filter unit comprises: a first inductor, a second inductor and a capacitive branch, wherein one side of the first inductor is serially connected with one side of the second inductor, the capacitive branch comprises at least one first capacitor, one side of the capacitive branch is electrically connected at the connecting point of the first inductor and the second inductor, the other side thereof is connected at the same point with two capacitive branches in the other sets of the LCL filter unit; the other side of the first inductor is electrically connected to the single phase AC power source in the three-phase AC power source, the other side of the second inductor is electrically connected to one set of the single phase rectification bridge-arms. Wherein, the power factor of the three-phase AC power source is matched with the parameters of the LCL filter unit so as to make the absolute value of the phase difference between the input voltage and current of the Vienna rectifier is close or equal to zero.

In another aspect, to achieve the above purposes, a solution of an application system of the three-phase rectification module of the invention is as follows.

The application system of the three-phase rectification module comprises the three-phase rectification module for converting AC voltage to DC voltage mentioned above; an inverting module electrically connected with the three-phase rectification module for converting DC voltage to AC voltage, and a load electrically connected with the inversing module.

In another aspect, to achieve the above purposes, a method for suppressing the harmonic of the three-phase rectification module in the invention is as follows.

The harmonic suppression method of the three-phase rectification module comprises:

step 1: with switch frequency of the three-phase uni-directional rectification unit, setting parameters of the first inductor, the element in capacitive branch and the second inductor in the LCL filter unit to suppress switch order harmonic of the three-phase uni-directional rectification unit and to obtain the first parameter combination set of the LCL filter unit parameters;

step 2: adjusting power factor of the three-phase power source and obtaining a relationship curve between the power factor and the phase difference between the input phase voltage and phase current of the three-phase uni-directional rectification unit, corresponding to each set of parameter value combination in the first parameter combination set;

step 3: with the relationship curve formed from step 2, obtaining the second parameter combination set, wherein the power factor is less than one and the absolute value of the phase difference is close or equal to zero, and selecting a set of the second parameter combination set as the parameters of the LCL filter unit to suppress the low order harmonic.

The three-phase rectification module of the invention not only has fine power factor correction capability and DC voltage controlling capability, but also has the advantages of simple structure, low THD of the input current, less switching devices, anti-break-though capability, small volume of the filter unit, and high reliability, and it is especially suitable to apply in the case of large power without energy feedback. Harmonic is attenuated in a rate of −60 dB/Dec in the LCL filter unit of the invention, which is about three times of that by single inductor L filter unit. Thus, the LCL filter unit described above can achieve the same filtering effect in a condition of low total inductance, reduce the volume of filter unit, save the production cost, improve the dynamic performance greatly and help to suppress the low order harmonic caused by the three-phase uni-directional rectification unit.

DETAILED DESCRIPTION OF THE EMBODIMENTS

Preferred embodiments of the present invention will be described in more detail below with the reference to the drawings.

Some typical embodiments presenting features and advantages of the invention will be described subsequently in detail. It should be noted that, various modifications can be made to the invention in different examples all of which do not depart from the scope of the invention, and the description and drawings are only used for illustrating but not limiting the invention.

Figure 1:
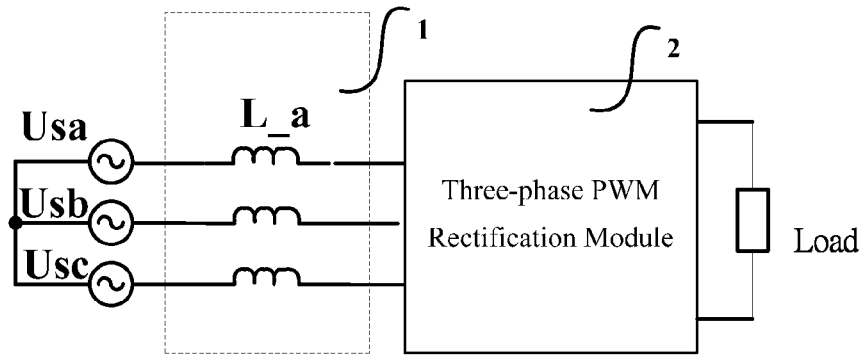
FIG. 1 is a diagram of a circuit in which a three-phase PWM rectification module with an inductor L filter unit in the art.
Figure 2:
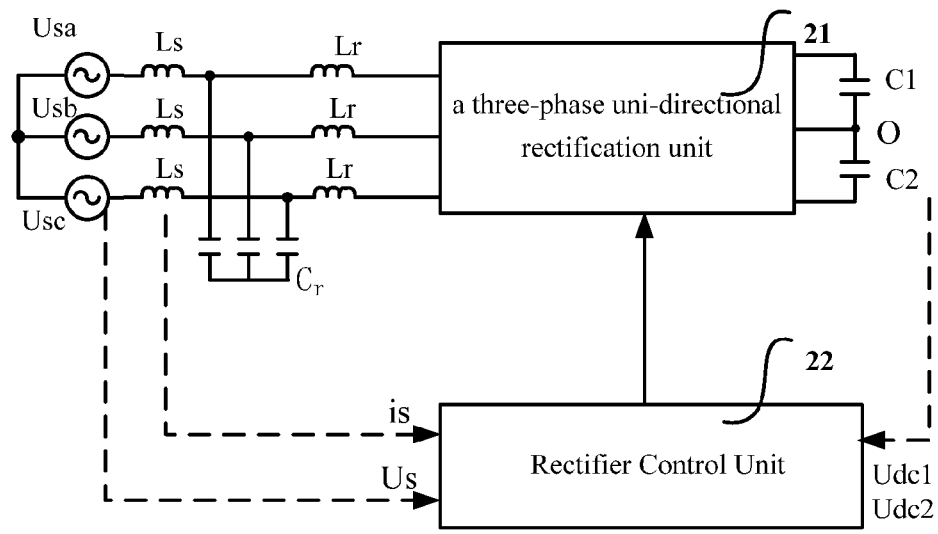
FIG. 2 is a control block diagram of a three-phase rectification module with a LCL filter unit according to the invention.

In one embodiment, FIG. 2 is the control block diagram of the three-phase rectification module with a LCL filter unit according to the invention. As shown, the three-phase rectification module in the embodiment of the invention is connected with three-phase AC power source, and the three-phase rectification module includes three sets of LCL filter unit, a three-phase uni-directional rectification unit 21, and a rectifier control unit 22. The three sets of LCL filter unit is electrically connected between the three-phase uni-directional rectification unit 21 and the three-phase AC power source. The rectifier control unit 22 controls the power factor of the three-phase AC power source and the DC output voltages (Udc1 and Udc2) of the three-phase uni-directional rectification unit 21. Grid or other type of AC power source is used for the generation of the three-phase AC power source, and the following description is only with the example of three-phase AC power source from grid.

The three-phase uni-directional rectification unit includes three sets of the single phase rectification bridge-arms which are connected in parallel. At least one commutation diode is serially connected on each set of the single phase rectification bridge-arms, which makes the bridge-arm current function as uni-direction. Further, on the single phase rectification bridge-arms, there is also at least one switch device and a control unit for controlling the switch devices on the respective single phase rectification bridge-arms to perform switch action. Additionally, the commutation diode mentioned herein is referred to the diode responsible for transferring all load current if the switch device on bridge-arm is turned off under working switch frequency of the three-phase uni-directional rectification unit. Further, since the commutation diode limits the direction of the bridge-arm current, the break-through can't occur even if there are two switch elements in the same phase bridge-arm and these two switch elements turn on or off simultaneously, that is, it won't affect normal operation of effective switch elements. Compared with conventional PWM rectifier, the three-phase uni-directional rectification unit is simple and reliable for control, and simple in structure with less switch elements. When applied in a case of medium and high voltage and high power, for example, when the three-phase uni-directional rectification unit is directly connected with the grid having medium and high voltage, it is advantageous in price relative to the PWM rectifier applied in the same case of medium and high voltage and large power.

Figure 3:
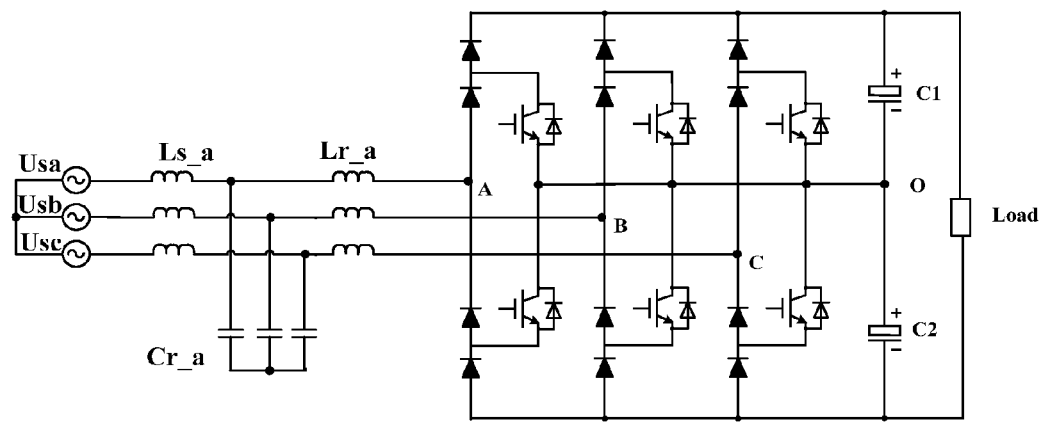
FIG. 3 is a detailed circuit diagram of a preferred embodiment of the three-phase rectification module with a LCL filter unit according to the invention.
Figure 4:
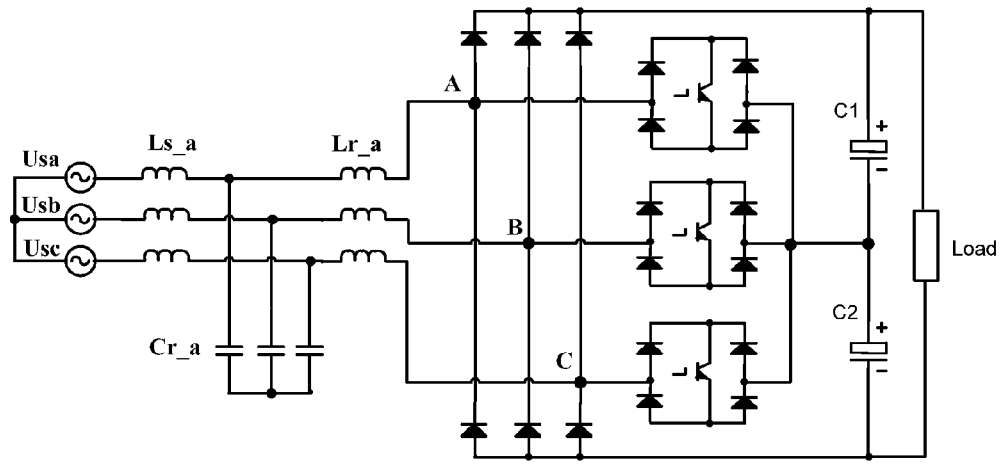
FIG. 4 is detailed circuit diagram of another preferred embodiment of the three-phase rectification module with a LCL filter unit according to the invention.

The embodiment of the invention takes the three-phase rectification module applying in full wave rectification as an example, and at least one commutation diode is employed on the upper part and lower part of the single-phase rectification bridge-arm respectively in the three-phase uni-directional rectification unit. The three-phase uni-directional rectification unit with this typical structure is represented by the three-phase Vienna rectifier, referring to the diagrams of detailed structures of two types of the three-phase Vienna rectifier in FIGS. 3 and 4, in which the controller of the switch element of the Vienna rectifier isn't shown.

Figure 5:
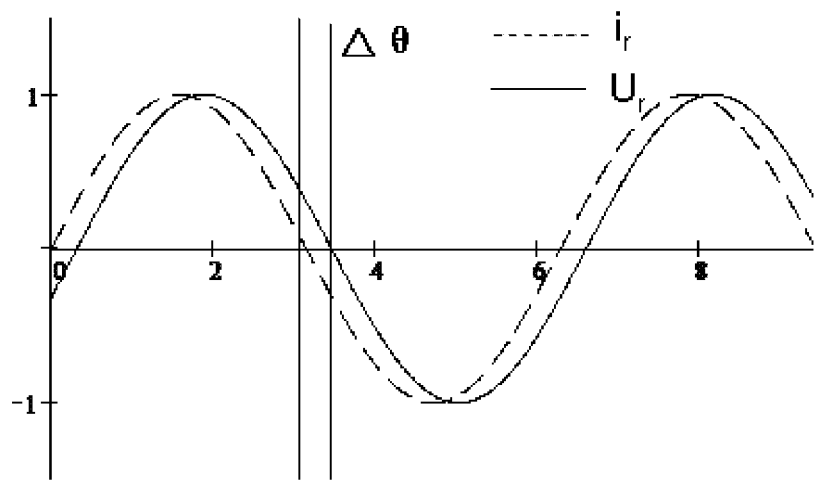
FIG. 5 is wave-shape diagram of an AC input voltage of conventional PWM rectifier and a current flowing through the PWM rectifier.
Figure 6:
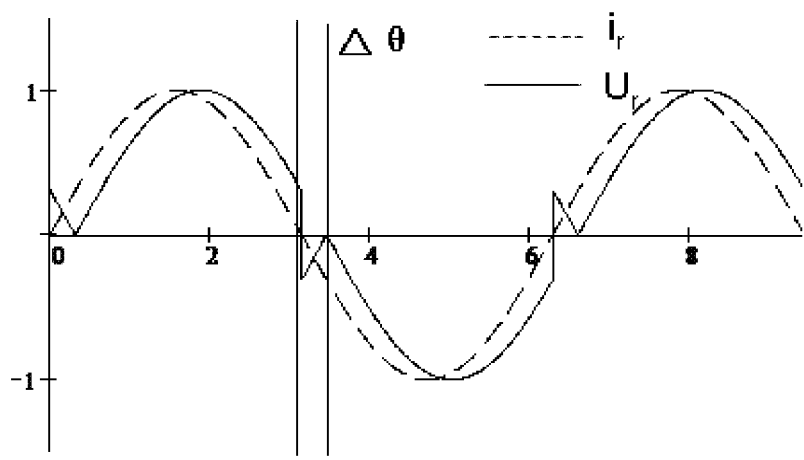
FIG. 6 is a diagram of AC input voltage aberration of a Vienna rectifier while Vienna rectifier has phase difference Δθ between the AC input voltage and the current flowing through the Vienna rectifier.

The nature of the three-phase uni-directional rectification unit is different from that of the conventional PWM rectifier. Herein, the comparison between the Vienna rectifier and conventional PWM rectifier is taken as an example, referring to FIGS. 5 and 6. FIG. 5 is a wave-shape diagram showing an AC input voltage of the conventional PWM rectifier and a current flowing through the conventional PWM rectifier. As shown in FIG. 5, the wave-shape of the phase current Ir advances that of the AC input voltage (phase voltage) Ur by a phase difference $\Delta\theta$, and the phase voltage Ur isn't affected by the phase current Ir during the region of the phase difference $\Delta\theta$. FIG. 6 is a diagram of voltage aberration of a Vienna rectifier while the Vienna rectifier has a phase difference $\Delta\theta$ between the phase voltage and phase current flowing through the Vienna rectifier. In FIG. 6, the wave-shape of the phase current Ir still advances that of the phase voltage Ur by a phase difference $\Delta\theta$.

Since the presence of the commutation diode on the single phase rectification circuit bridge-arm in the Vienna rectifier, the bridge-arm functions as uni-direction, in the region of the phase difference $\Delta\theta$, the direction of the phase voltage Ur of the Vienna rectifier depends on the direction of the phase current ir mainly, until the phase voltage Ur is converted to the same direction as the phase current ir. Thus, the region of phase difference $\Delta\theta$ may be considered as "out-of-control region" of the Vienna rectifier, and aberration will occur on the phase voltage Ur of the Vienna rectifier in this region, which may result in a lot of low order harmonics included in the phase voltage Ur. The increase of low order harmonics of the phase voltage Ur of the Vienna rectifier results in corresponding increase of low order harmonics of the grid current finally, especially in the case of medium and high voltage and large power, switch frequency is low which are affected by the nature of the device, and the harmonic effect originating from this out-of-control region is more serious.

The presence of the out-of-control region is a main reason which causes low order harmonics, and the bigger the out-of-control region is, the larger the content of low order harmonic is. The same issue may exist in all the three-phase uni-directional rectification units not just in the Vienna rectifier. However, the phase difference between the AC current and voltage of the three-phase uni-directional rectification unit can be compensated by setting the parameters of pre-filter unit to minimize the phase difference $\Delta\theta$, such that the low order harmonic may be extremely reduced. Thus, the design of the pre-filter units of the three-phase uni-directional rectification unit becomes very important.

The pre-filter unit in the embodiment of the three-phase rectification module in the invention includes three sets of the LCL filter unit. Each set of the LCL filter unit includes a first inductor Ls, a second inductor Lr and a capacitive branch. One side of the first inductor Ls is serially connected with one side of the second inductor Lr. The capacitive branch includes at least a first capacitor Cr, and one side of the capacitive branch is electrically connected at the connecting point of the first inductor Ls and the second inductor Lr, the other side thereof is connected at the same point with the other sets of capacitive branch. The other side of the first inductor Ls is electrically connected to single phase AC power source in the three-phase AC power source, the other side of the second inductor Lr is electrically connected to a set of the single-phase rectification bridge-arm.

Figure 7:
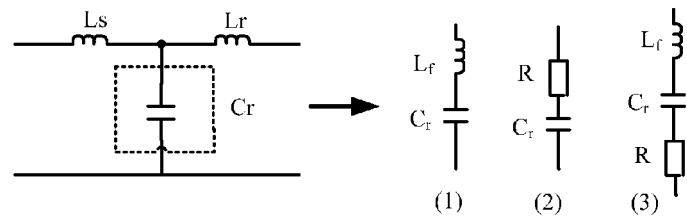
FIG. 7 is three modified circuits of the capacitive branch of the LCL filter unit according to the embodiment of the invention.

In order to reduce the inductance value of the LCL filter unit and suppress switch order harmonic of the three-phase uni-direction rectification unit preferably, the capacitive branch may further comprise a trap inductor in the second embodiment of the LCL filter unit, as shown in FIG. 7(1), wherein the trap inductor Lf is serially connected with the first capacitor Cr.

In order to suppress resonation phenomenon of the LCL filter unit, the capacitive branch may further comprise a damp resistor in the third embodiment of the LCL filter unit, as shown in FIG. 7(2), in which the damp resistor R is serially connected with the first capacitor Cr.

In the fourth embodiment of the LCL filter unit, the capacitive branch may further comprise a trap inductor and a damp resistor together, as shown in FIG. 7(3), wherein the trip inductor, the damp resistor and the first capacitor are serially connected with each other. This may suppress resonation phenomenon of the LCL filter unit and reduce the inductance value of the LCL filter unit, and suppress switch order harmonic of the three-phase uni-directional rectification unit as well.

Figure 8:
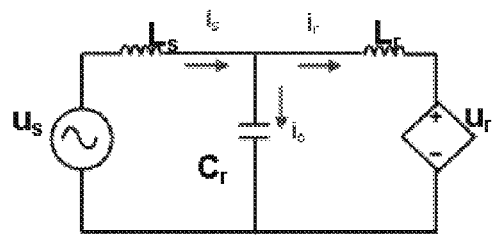
FIG. 8 is a diagram of a single phase equivalent circuit of the LCL filter unit used in the embodiment of the invention.

More descriptions are given below as an example in which the capacitive branch of the LCL filter unit includes only a first capacitor as the pre-filter of the three-phase uni-directional rectification unit. FIG. 8 is a diagram of the single-phase equivalent circuit of the LCL filter unit. Herein, with PF assumed to be power factor of AC source, the equations (1)-(6) may be made.

$$\dot{U}_s = U_s < 0° \tag{1}$$

$$\dot{I}_s = I_s < \theta_s = I_s \cos\theta_s + jI_s \sin\theta_s \tag{2}$$

$$PF = \cos\theta_s \tag{3}$$

$$\dot{U}_c = \dot{U}_s - j\omega L_s \dot{I}_s \tag{4}$$

$$\dot{I}_r = \dot{I}_s - j\omega C_r \dot{U}_c \tag{5}$$

$$\dot{U}_r = \dot{U}_c - j\omega L_r \dot{I}_r \tag{6}$$

$$\Delta\theta = <\dot{U}_r - <\dot{I}_r \tag{7}$$

In the above equations (1)-(6), the power factor PF, grid-side voltage Us, grid-side current Is, first inductor Ls, second inductor Lr and capacitive branch Cr may be considered as known variables, with the Ur, Ir and Uc being considered as unknown variables. Herein, Ur represents the AC input phase voltage of the three-phase uni-directional rectification unit, Ir represents AC input phase current of the three-phase uni-directional rectification unit, Uc represents the voltage of the capacitive branch. The relationship between the phase different $\Delta\theta$ and the AC input phase current Ir, phase voltage Ur of the rectification module may be deduced from equations (1)-(6), which are listed above as equation (7).

It can be seen from the above equations that, the phase different $\Delta\theta$ may be represented as a function of independent variables which are power factor PF, the voltage Us of the three-phase AC power source, the voltage Us of the three-phase AC power source, the first inductor Ls, the second inductor Lr and the parameter Cr of the capacitive branch.

Thus, in a condition that power factor is greater than or equal to a default value, it will be probable to achieve that the absolute value of the phase difference $\Delta\theta$ between the AC input voltage and current of the three-phase uni-directional rectification unit is close or equal to a preset threshold by selecting the LCL filter unit parameter matched with the power factor properly. In practice, in order to reduce low order harmonics produced by three-phase rectification module in the embodiment as much as possible, preferably, the preset threshold of phase difference in the three-phase uni-directional rectification unit is zero. In order to improve energy usage rate of the three-phase AC power source, preferably, the default value of power factor is 0.95.

An application system in which the three-phase rectification module is applied will be described below in detail in corporation with the embodiment of the above three-phase rectification module.

Figure 9:
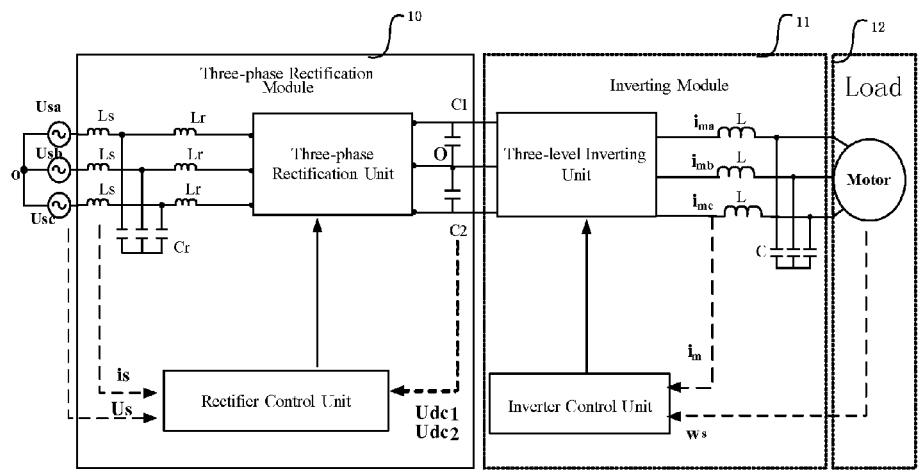
FIG. 9 is a control block diagram of a Back-to-Back inverter with a three-phase rectification module of the invention.

FIG. 9 is a control block diagram of a Back-to-Back inverter with the three-phase rectification module of the invention. The embodiment of the application system of the three-phase rectification module of the invention comprises the three-phase rectification module mentioned above, for converting AC into DC; the inverting module electrically connected with the three-phase rectification module, for converting DC into AC; and the load electrically connected with the inverting module.

In the application system of the three-phase rectification module of the invention, the three-phase rectification module may be any combination of various constitutive units according to the above embodiments of the three-phase rectification module. The rectifier control unit of the three-phase rectification module is principally the same as that of conventional PWM rectifier, which is well-known for the person skilled in the art and won't be discussed any more. The inverting module also has corresponding inverter control unit which is principally the same as that of common inverting module, so it will not be discussed any more.

In another embodiment of the application system of the three-phase rectification module of the invention, the application system further comprises a capacitor output module for temporarily storing DC voltage, the capacitor output module is electrically connected between the three-phase rectification module and the inverting module.

In another embodiment of the application system of the three-phase rectification module of the invention, the application system further comprises an output LC filter unit electrically connected between the load and the inverting module for filtering.

FIG. 9 shows a Back-to-Back inverter with the three-phase rectification module implemented by a combination of the three types of the application system of the three-phase rectification module 10 according to the above embodiments. Herein, the inverting module 11 is selected as three-phase variable frequency driver, for driving an electric motor as a load 12. Herein, the inverting module 11 isn't limited to variable frequency driver, and the load 12 isn't limited to electric motor. Since the applied front-end three-phase rectification module 10 is simple in structure with less switch elements and simple for control compared with other front-end rectification module, the entire application system inherits this advantage and may be applied in the case of medium and high voltage and large power.

An embodiment of the method to suppress harmonic by the three-phase rectification module mentioned above will be described simply below. The method of suppressing harmonic by the three-phase rectification module comprises:

step 1: based on switch frequency of the three-phase uni-directional rectification unit, setting the parameters of the first inductor, element in capacitive branch and second inductor in the LCL filter unit to suppress switch order harmonic of the three-phase uni-directional rectification unit and to obtain a first parameter combination set of the LCL filter unit parameters;

step 2: adjusting the power factor of the three-phase power source and obtaining relationship curves between the power factor and the phase difference of the input phase voltage and phase current of the three-phase uni-directional rectification unit, each relationship curve corresponds to each set of parameter combination in the first parameter combination set;

step 3: based on the relationship curves of step 2, obtaining a second parameter combination set in which the power factor is greater than or equal to the default value and the absolute value of the phase difference is close or equal to zero, selecting a set of the second parameter combinations as the parameters of the LCL filter unit to suppress the low order harmonic.

In practice, since the pre-filter unit, the LCL filter unit of the three-phase rectification module, can be designed in different methods, it is taken as an example below that the capacitive branch of the LCL filter unit includes only the first capacitor. That is, the LCL filter unit consists of the first inductor, second inductor and first capacitor.

According to the restrictive regulation of harmonic pollution produced by electric equipment to the grid that USA Institute of Electrical and Electronics Engineers (IEEE-519 for short) offered, the harmonic pollution produced by the three-phase rectification module to the grid is mainly embodied on switch order harmonic and low order harmonic component of the grid-side current. Thus, the LCL filter unit is necessarily capable of suppressing switch order harmonic of the three-phase rectification module working under a certain switch frequency, and suppressing low order harmonic produced by the three-phase uni-direction rectification unit.

Step 1: based on operation frequency fs of the three-phase uni-directional rectification unit, setting the parameter values of the first inductor Ls, the second inductor Lr, and the first capacitance Cr to achieve the purpose of suppressing switch order harmonic of the three-phase uni-directional rectification unit. In order to suppress switch order harmonic of the three-phase rectification module under operation frequency, the designed LCL filter unit parameter satisfies the following equations (8)-(10) in switch frequency. Herein, S=j2πfs, i1 represents the peak of fundamental wave phase current of the electric net current Is; $i_{THD\_Limit_n}$ represents restrictive regulation to harmonic of the electric current Is by IEEE-519, in which requirements to harmonic component of each frequency section are also included; Ur_n represents the voltage peak of the Nth harmonic of the input phase voltage Ur of the three-phase rectification module.

$$G_{IsUr} = \frac{1}{(L_s L_r C_r)S^3 + (L_s + L_r)S} \tag{8}$$

$$IL_{Needed} = 20\log\left(\frac{i_1 i_{THD\_Limit_n} \times \sqrt{3}}{U_{r\_n}}\right) \quad (9)$$

$$|20\log|G_{IsUr}|| \geq |IL_{Needed}| \quad (10)$$

It can be seen from the above equations that, there are actually several sets of the parameters of the first inductor Ls, the second inductor Lr, and the first capacitance Cr which satisfy equations (8)-(10). Thus, the first parameter combination set of the LCL filter unit may be obtained.

Figure 10:
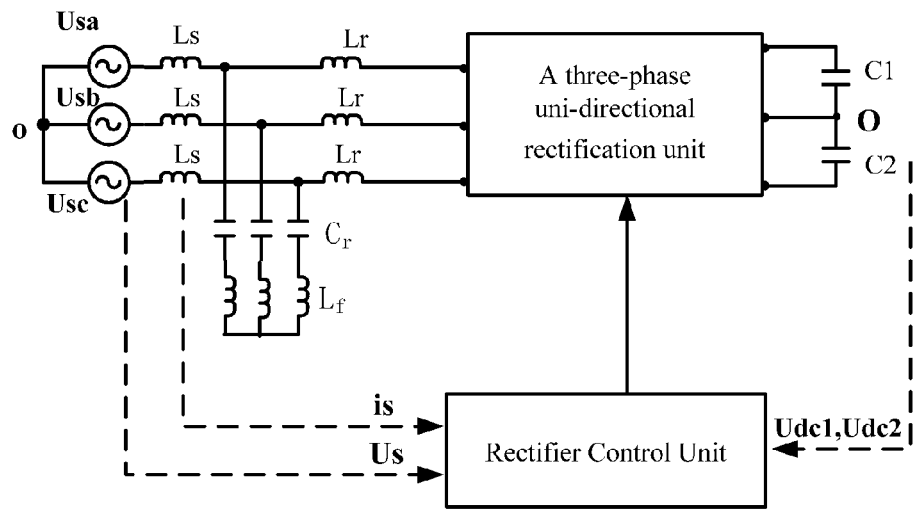
FIG. 10 is a control block diagram of a three-phase rectification module which has an inductor Lf serially connected to each capacitive branch of the LCL filter unit according to a preferred embodiment of the invention.

In another embodiments of the three-phase rectification module, a trap inductor may be added in the capacitive branch of the LCL filter unit, which is serially connected with the first capacitor Cr. FIG. 10 is a control block diagram of the three-phase rectification module in which a inductor Lf is serially connected to the capacitive branch of the LCL filter unit according to a preferred embodiment of the invention.

Figure 11:
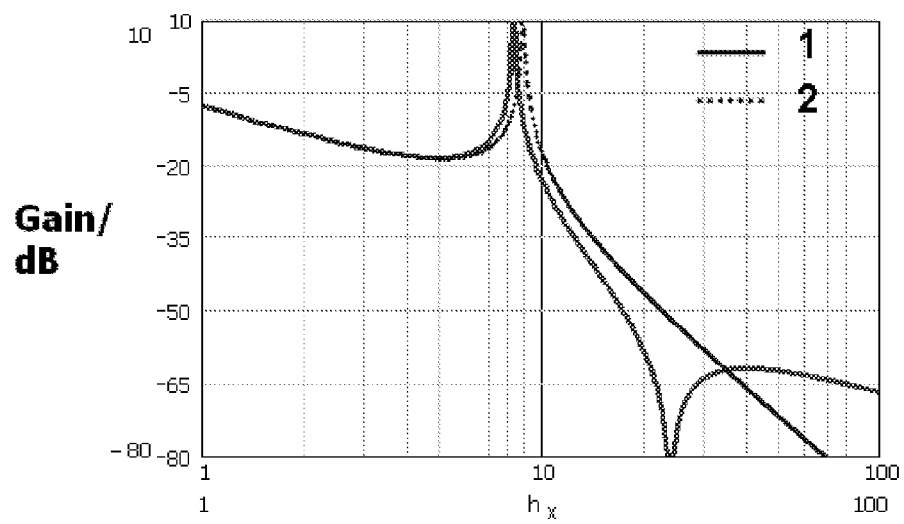
FIG. 11 is a bode diagram of comparison between two different sets of LCL filter unit applied in the embodiment of the invention, whose difference is whether the capacitive branch of the LCL filter unit has a trap inductor or not.

FIG. 11 is a bode diagram comparing the LCL filter unit in which a trap inductor is serially connected to the one with another LCL filter unit in which there is no trap inductor in the capacitive branch. As shown, the curve 1 is a bode diagram showing that a trap inductor Lf is serially connected in the capacitive branch of LCL filter unit, and the trap inductor Lf and the capacitor Cr form a serial resonance, and a sinking harmonic peak is formed at the resonance frequency $f_{LC}$. If the resonance frequency $f_{LC}$ is set adjacent to the switch frequency fs, the harmonic component at switch frequency may be greatly attenuated. Compared with the LCL filter unit in which there is no trap inductor in the capacitive branch as shown in curve 2, when the harmonic attenuation target at the same switch frequency, the inductance used by the LCL filter unit in curve 1 is greatly reduced, such that the target of reducing volume of the three-phase rectification module and saving cost is achieved.

Figure 12:
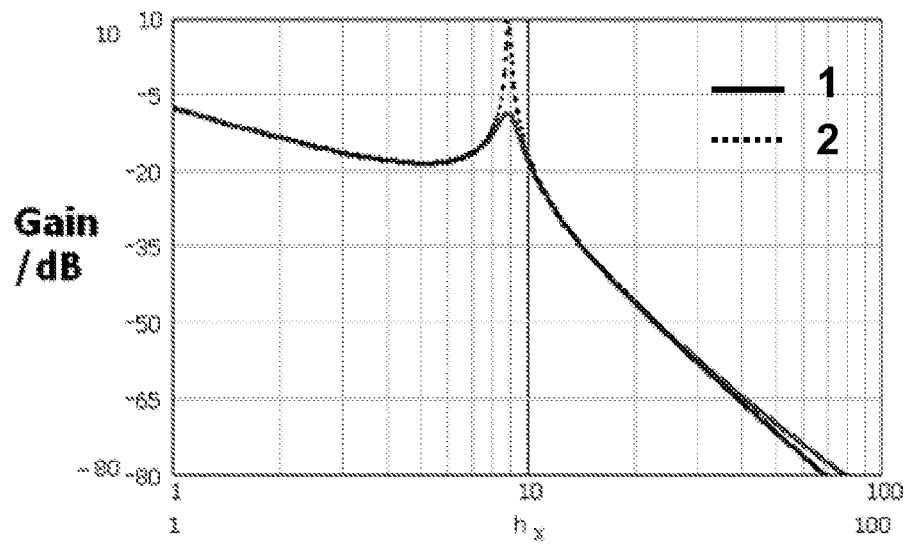
FIG. 12 is a bode diagram of comparison between two different sets of the LCL filter unit applied in the embodiment of the invention, whose difference is whether the capacitive branch of the LCL filter unit has a damp resistor or not.

In another embodiment of the three-phase rectification module, a damp resistor may be added in the capacitive branch of the LCL filter unit which is serially connected with the first capacitor Cr. Referring to FIG. 12, FIG. 12 is a bode diagram comparing one LCL filter unit in which a damp resistor is serially connected in the capacitive branch with another LCL filter unit in which there is no damp resistor in the capacitive branch. Curve 1 is a bode diagram showing that a damp resistor is serially connected in the capacitive branch of the LCL filter unit, curve 2 is a bode diagram showing that the capacitive branch of the LCL filter unit only comprises the first capacitor Cr in. By comparison, the LCL filter unit in which a damp resistor is serially connected to the capacitive branch may finely suppress the occurrence of resonance phenomenon.

In still another embodiment of the three-phase rectification module, the capacitive branch of the LCL filter unit includes a trap inductor, a damp resistor and the first capacitor. The trap inductor and the damp resistor are serially connected with the first capacitor. The LCL filter unit of this embodiment may have the advantages of the above two embodiments of the LCL filter unit.

In three embodiments of the LCL filter unit mentioned in above three paragraphs, when parameter values of the LCL filter is set to suppress switch order harmonic by the three-phase uni-directional rectification unit, with a trap inductor being added in the capacitive branch of the LCL filter unit, the first parameter value combination set of the LCL filter unit parameters is just obtained by using equations (11)-(14), and a sinking resonance peak is introduced at switch frequency by the trap inductor Lf and the capacitor Cr, the resonance frequency is $f_{LC}$, $S=j2\pi fs$.

$$G_{IsUr} = \frac{L_f C_r S^2 + 1}{(L_s L_r C_r + L_f L_r C_r + L_f L_s C_r)S^3 + (L_s + L_r)S} \quad (11)$$

$$IL_{Needed} = 20\log\left(\frac{i_1 i_{THD\_Limit_n} \times \sqrt{3}}{U_{r\_n}}\right) \quad (12)$$

$$f_s = f_{LC} = \frac{1}{2\pi\sqrt{L_f C_r}} \quad (13)$$

$$|20\log|G_{IsUr}|| \geq |IL_{Needed}| \quad (14)$$

In another embodiment of method for suppressing harmonic by the three-phase rectification module, the method of setting the parameter of the LCL filter unit in step 1 may be different from the embodiment of the method mentioned above. Of course, the parameter value of the LCL filter unit is also needed to satisfy the equations (8)-(10) or (11)-(14), which depends on the specific structure of the capacitive branch in the LCL filter unit. Herein, it is taken as an example that only the first capacitor Cr is included in the capacitive branch of the LCL filter unit, and the second inductor Lr is selected based on the following principle: the input phase current Ir of the three-phase rectification module has a large pulse fluctuation, if the fluctuation exceeds a certain range, the switch element may be overheated and its working life may be affected. The current flowing through the second inductor Lr is the phase current ir, and the bigger the second inductor Lr is, the smaller the pulse fluctuation of phase current Ir is. Generally, the pulse fluctuation range of the bridge-arm phase current Ir may be determined according to the switch elements selected in the three-phase uni-directional rectification unit, the value of the second inductor Lr can be further determined, then the combination sets of parameter of the first inductor Ls and the first capacitor Cr are obtained according to equations (8)-(10), and a sub-optimized first parameter combination set of the LCL filter unit is further obtained.

As described in the above embodiments of the three-phase rectification module, the second inductor Lr is closer to the three-phase uni-directional rectification unit than the first inductor Ls, so the value of the second inductor Lr in an optimized first parameter combination set of the LCL filter unit should be greater than or equal to the value of the first inductor Ls, which is advantageous to reduce the Current Ripple in the AC Side of the three-phase uni-directional rectification unit.

Therefore, in theory, the amount of the sub-optimized or the optimized first parameter combination sets of the LCL filter unit in this embodiment should be less than the amount of the first parameter combination set of the LCL filter unit parameters in step 1 of the above three-phase rectification module embodiment. In this embodiment, in order to make the inductance of the LCL filter unit smaller, the inductance of the second inductor Lr is determined by the minimum inductance rule, on condition that the inductance meets the requirement of current ripple in phase current Ir which is based on the selected switch element in the three-phase uni-directional rectification unit.

Figure 13:
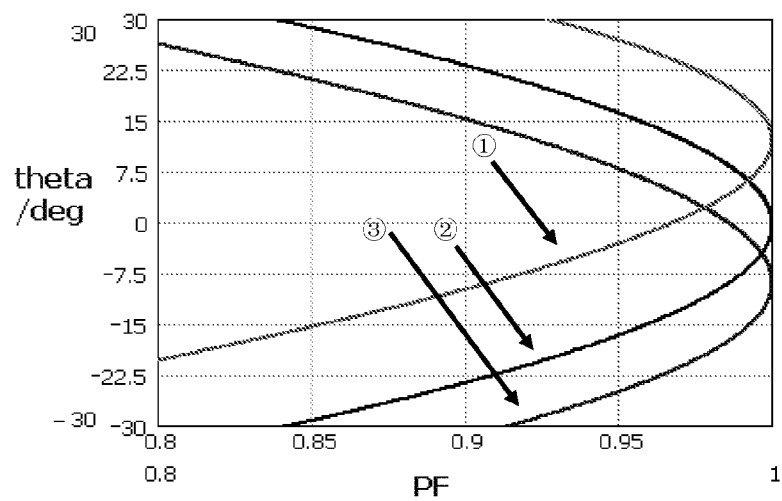
FIG. 13 illustrates relationship curves between the power factor and phase difference based on three sets of LCL filter unit applied in the embodiment of the invention.

Step 2:

In step 2, by adjusting power factor of the three-phase power source, a relationship curve between the power factor and the phase difference between the input phase voltage and phase current of the three-phase uni-directional rectification unit is obtained, which corresponds to each set of the parameter combination in the first parameter combination set. Referring to FIG. 13, FIG. 13 illustrates three sets of relationship curve between the power factor and the phase difference. Corresponding to each set of the first parameter combination. The value of the second inductor Lr of the LCL filter unit is equal in curves ①, ②, ③. The inductance of the first inductor Ls in curve ① is the smallest relative to that in curves ② and ③, and the capacitance of the first capacitor Cr of the capacitive branch is the largest. The inductance of the first inductor Ls of curve ③ is the largest relative to that in curves ① and ②, and the capacitance value of the first capacitor Cr of capacitive branch is the smallest. The values of the first inductor Ls and the first capacitor Cr in capacitive branch of curve ② lie between that in curves ① and ③.

Step 3:

Next, the step 3 is, based on the relationship curve of step 2, obtaining the second parameter combination set in which power factor is greater than or equal to the default value and the absolute value of the phase difference is close or equal to zero, and then selecting a set of the second parameter combination as the parameters of the LCL filter unit to suppress the low order harmonic.

Generally, in order to attain a preferred effect of suppressing low order harmonic, in step 3, in the case that power factor is greater than or equal to a default value, the second parameter combination set is selected in which the absolute value of the phase difference is equal to zero. If the size and cost of the LCL filter unit are not considered, a parameter combination in the second parameter combination sets corresponding to the largest power factor is selected when the phase difference is equal to zero. If the size of the LCL filter unit is considered, that is, the inductance parameter of the LCL filter unit needs to meet some requirements, and a parameter combination with the smallest inductance is generally selected in the second parameter combination set. Thus, the final decision of the parameters of the LCL filter unit depends on the design requirement of the application environment, and isn't limited to the above illustrations.

In order to improve energy efficiency of the three-phase AC power source and to effectively suppress low order harmonic produced by the three-phase uni-directional rectification unit, the fact that power factor is greater than or equal to 0.95 and the absolute value of phase difference is close or equal to zero is taken as an example and described with reference to FIG. 13. Referring to FIG. 13, when the parameter combination sets of the LCL filter unit corresponding to three curves in FIG. 13 satisfies the condition that the power factor is greater than or equal to 0.95 and the absolute value of the phase difference may be equal to zero, the three sets of the parameter combination of the LCL filter unit corresponding to three curves belong to the second parameter combination sets of the LCL filter unit. If the size and cost of the LCL filter unit are not considered, the parameter combination of the LCL filter unit corresponding to curve ② may be selected. If the size and cost of the LCL filter unit are considered, the parameter combination of the LCL filter unit corresponding to curve ① may be selected.

In step 1 of another embodiment of method for suppressing harmonic of the three-phase rectification module, the fluctuation range of the bridge-arm phase current Ir may be determined by the selected switch element in the three-phase uni-directional rectification unit, and the value of the second inductor Lr can be further determined, and then the combination sets of the first inductor Ls and the first capacitor Cr is determined by equations (8)-(10) to obtain the sub-optimized first parameter value combination set of the LCL filter unit. And further, the optimized first parameter combination set of the LCL filter unit could be obtained by further adjusting the inductance of the first inductor Ls less than or equal to the second inductor Lr. In step 1 of the embodiment of the method, both the sub-optimized first parameter combination sets and the optimized first parameter combination set may possibly lead to the result that a set of the second parameter combination set satisfying the condition in step 3 or other preset design parameters of the LCL filter unit cannot be obtained. So the resolution is re-adjusting the second inductor value by returning to step 1, to obtain the re-adjusted sub-optimized first parameter combination set. In order to make the inductance of the LCL filter unit smaller, it is taken as an example for better description that the second inductor Lr is selected to be the selectable minimum in the fluctuation range of the phase current Ir on the bridge-arm which is determined by the selected switch element in the three-phase uni-directional rectification unit. Accordingly, a set of the second parameter combination set satisfying the condition in step 3 or other preset design parameters of the LCL filter unit cannot be obtained, and the solution to it is increasing second inductor Lr value to obtain the re-adjusted optimized first parameter combination set by returning to step 1, and performing the subsequent steps 2 and 3 using the adjusted optimized first parameter combination set.

The above description is merely a preferred embodiment of the invention, and the embodiment isn't used to limit the scope claimed by the invention. Thus, all of equivalent structure modification with reference to the description and drawings of the invention are contained by the protection scope of the invention.

The invention claimed is:

1. A three-phase rectification module connected with a three-phase AC power source, comprising:
    a Vienna rectifier comprising three sets of single phase rectification bridge-arms connected in parallel, wherein each set of the single phase rectification bridge-arm comprises at least one switch with a low switch frequency;
    three sets of LCL filter units, each set of the LCL filter unit comprising: a first inductor, a second inductor and a capacitive branch, wherein one side of the first inductor is serially connected with one side of the second inductor, wherein the capacitive branch comprises at least one first capacitor, one side of the capacitive branch is electrically connected at a connecting point of the first inductor and the second inductor, the other side thereof is connected at the same point with the capacitive branch in the other sets of the LCL filter unit; the other side of the first inductor is electrically connected to a single phase AC power source in the three-phase AC power source, the other side of the second inductor is electrically connected to a set of the single phase rectification bridge-arms; and
    a rectifier control unit for controlling a power factor of the three-phase AC power source to be less than one and a DC output voltage of the Vienna rectifier;
    wherein, the power factor of the three-phase AC power source is matched with parameters of the LCL filter unit so as to make an absolute value of a phase difference between an input phase voltage and a phase current of the Vienna rectifier is close or equal to zero to reduce low order harmonic and to reduce a volume of the LCL filter unit.

2. The three-phase rectification module according to claim 1, wherein the capacitive branch further comprises a trap inductor electrically and serially connected with the first capacitor.

3. The three-phase rectification module according to claim 1, wherein the capacitive branch further comprises a damp resistor electrically and serially connected with the first capacitor.

4. The three-phase rectification module according to claim 3, wherein the capacitive branch further comprises a trap inductor, wherein the trap inductor, the first capacitor and the damp resistor are serially connected with each other.

5. The three-phase rectification module according to claim 1, wherein the inductance of the first inductor is less than or equal to the inductance of the second inductor.

6. The three-phase rectification module according to claim 1, wherein the power factor of the three-phase AC power source is equal to or greater than 0.95.

7. The three-phase rectification module according to claim 1, wherein an absolute value of a phase difference between an input phase current and a phase voltage of the single phase rectification bridge-arms is equal to a preset threshold.

8. An application system of the three-phase rectification module, comprising: the three-phase rectification module according to claim 1, for converting AC voltage to DC voltage; an inverting module electrically connected with the three-phase rectification module, for converting DC voltage to AC voltage; and a load electrically connected with the inversing module.

9. The application system of the three-phase rectification module according to claim 8, wherein, the application system of three-phase rectification module further comprises a capacitor output module electrically connected between the three-phase rectification module and the inverting module for temporarily storing DC voltage.

10. The application system of the three-phase rectification module according to claim 8, wherein the application system of the three-phase rectification module further comprises an output LC filter unit electrically connected between the load and the inverting module.

11. The application system of the three-phase rectification module according to claim 8, wherein the inverting module is a three-phase variable-frequency drive.

12. The application system of the three-phase rectification module according to claim 8, wherein the load is an electric motor.

13. A harmonic suppression method of the three-phase rectification module according to claim 1, comprising:
step 1: based on a switch frequency of a Vienna rectifier, setting a plurality of parameters of a first inductor, at least an element in a capacitive branch and a second inductor in an LCL filter unit to suppress a switch order harmonic of the Vienna rectifier and to obtain a first parameter combination set of the parameters of the LCL filter unit;
step 2: adjusting a power factor of a three-phase power source and obtaining a relationship curve between the power factor and a phase difference between an input phase voltage and a phase current of the Vienna rectifier, corresponding to each set of parameter combination in the first parameter combination set;
step 3: based on the relationship curve formed from step 2, obtaining a second parameter combination set, in which the power factor is less than one and the absolute value of the phase difference is close or equal to zero, and selecting a set of the second parameter combination set as the parameters of the LCL filter unit to suppress a low order harmonic of the Vienna rectifier.

14. The harmonic suppression method of the three-phase rectification module according to claim 13, wherein, a trap inductor serially connected with the first capacitor is added in the capacitive branch.

15. The harmonic suppression method of the three-phase rectification module according to claim 13, wherein, a damp resistor serially connected with the first capacitor is added in the capacitive branch.

16. The harmonic suppression method of the three-phase rectification module according to claim 13, wherein, a trap inductor and a damp resistor serially connected with the first capacitor are added together in the capacitive branch.

17. The harmonic suppression method of the three-phase rectification module according to claim 13, wherein, the step 1 is divided into the following steps:
step 1a: with a reference to parameters of the switch element in the Vienna rectifier, selecting a parameter of the second inductor in the first parameter combination set matching with the parameters of the switch element;
step 1b: based on the selected parameter of the second inductor and a condition of suppressing switch order harmonic under the switch frequency of the Vienna rectifier, setting parameters of the first inductor and the element in the capacitive branch in the first parameter combination set.

18. The harmonic suppression method of the three-phase rectification module according to claim 17, wherein, a minimum parameter of the second inductor matching with the parameters of the switch element is selected in step 1a.

19. The harmonic suppression method of the three-phase rectification module according to claim 17, wherein, the optimized first parameter combination set of the LCL filter unit parameter is obtained in step 1b by setting the first inductor less than or equal to the second inductor.

20. The harmonic suppression method of the three-phase rectification module according to claim 17, wherein, returning to step 1a of step 1, adjusting the second inductor parameter and performing re-setting of the parameters of the first inductor and/or the element in capacitive branch in step 1b, if the second parameter combination set in step 3 cannot be obtained by selecting in the first parameter combination set.

21. The harmonic suppression method of the three-phase rectification module according to claim 13, wherein, the parameter combinations of the LCL filter unit are set to be the second parameter combination set in step 3 in which power factor is less than one and the absolute value of the phase difference is equal to zero.

22. The harmonic suppression method of the three-phase rectification module according to claim 13, wherein, the power factor is equal to or greater than 0.95.

23. The harmonic suppression method of the three-phase rectification module according to claim 13, wherein, one set of the second parameter combination set selected in step 3 is the second parameter combination in which the inductor value is the minimum among the second parameter combination set.

* * * * *